United States Patent
Diaz et al.

(10) Patent No.: US 9,032,014 B2
(45) Date of Patent: May 12, 2015

(54) DIAGNOSTICS AGENTS FOR MANAGED COMPUTING SOLUTIONS HOSTED IN ADAPTIVE ENVIRONMENTS

(75) Inventors: Fabrice Diaz, Mougins (FR); Laurent Guiraud, Le Broc (FR)

(73) Assignee: SAP SE, Walldorf (DE)

( * ) Notice: Subject to any disclaimer, the term of this patent is extended or adjusted under 35 U.S.C. 154(b) by 376 days.

(21) Appl. No.: 13/471,025

(22) Filed: May 14, 2012

(65) Prior Publication Data

US 2013/0204921 A1    Aug. 8, 2013

Related U.S. Application Data

(60) Provisional application No. 61/595,608, filed on Feb. 6, 2012.

(51) Int. Cl.
| G06F 15/16 | (2006.01) |
|---|---|
| G06F 9/48 | (2006.01) |
| G06F 11/20 | (2006.01) |

(52) U.S. Cl.
CPC .......... *G06F 9/4856* (2013.01); *G06F 11/2025* (2013.01); *G06F 11/2046* (2013.01)

(58) Field of Classification Search
None
See application file for complete search history.

(56) References Cited

U.S. PATENT DOCUMENTS

| 7,457,722 | B1* | 11/2008 | Shain et al. ................. 702/182 |
|---|---|---|---|
| 7,693,983 | B1* | 4/2010 | Gupta et al. ................. 709/224 |
| 8,413,144 | B1* | 4/2013 | Manmohan et al. ............. 718/1 |
| 2002/0087881 | A1* | 7/2002 | Harif ............................ 713/201 |
| 2002/0156932 | A1* | 10/2002 | Schneiderman ............... 709/317 |
| 2004/0030778 | A1* | 2/2004 | Kronenberg et al. ........ 709/224 |
| 2005/0250470 | A1* | 11/2005 | Wen et al. .................... 455/405 |
| 2010/0128733 | A1* | 5/2010 | Putzolu ......................... 370/401 |
| 2011/0082962 | A1* | 4/2011 | Horovitz et al. ................ 711/6 |
| 2011/0225624 | A1* | 9/2011 | Sawhney et al. ............... 726/1 |
| 2011/0314345 | A1* | 12/2011 | Stern et al. .................. 714/47.1 |
| 2012/0117212 | A1* | 5/2012 | Fries ............................. 709/223 |

* cited by examiner

*Primary Examiner* — Joshua Joo
(74) *Attorney, Agent, or Firm* — Brake Hughes Bellermann LLP

(57) ABSTRACT

A solutions manager supports computing solutions running on hosts in an adaptive computing environment by utilizing remote processes or agents placed on the hosts. A remote agent is associated with a computing solution and placed on the host on which the computing solution is running. When the computing solution is relocated to a new host, the remote agent associated with the computing solution is also automatically relocated and restarted on the new host.

11 Claims, 12 Drawing Sheets

800

810
Each agent node controller (e.g., diagnostics agent 202) installed on a physical server sends a web service request locally to host agent 204 to retrieve the list of virtual host names declared on the physical host (e.g. host 430) periodically (e.g., every 45 seconds)

820A
Diagnostics agent 202 on host 420 may identify 'myCRM.app.com' as an additional host name on the retrieved list, and investigate its sub-process or child process list to determine if a corresponding agent node (e.g., Agent myCRM 208, FIG. 7) exists. If not, diagnostics agent 202 on host 420 may create and start a sub-process or agent node (e.g., Agent myCRM 208) for host 'myCRM' on host 420

820B
Diagnostics agents 202 on hosts 430 and 440 may investigate whether an agent node for host 'myCRM' exists on their respective sub-process or agent node lists. If it does, diagnostics agents 202 on hosts 420 and 440 may stop and delete the agent node for host 'myCRM' if it exists on hosts 420 and 440, respectively

830
Agent myCRM 208 for host 'myCRM,' which may have been a newly created agent node and started at block 820A, may connect to solutions manager 210 and resume it tasks of diagnosing and monitoring virtual host 'myCRM' on host 420

1010
When a managed system (e.g., system 470, FIG. 4) is relocated from a source physical host to a target physical host (e.g., as in FIG. 8), the name of the virtual host (e.g., Virtual host D) of the managed system may be declared into the OS kernel configuration list 901

1020
A virtual host move is detected on physical hosts on which process agent node controller 926 is running (e.g., at blocks 820A and 820B, FIG. 8)

1030
Agent node controller 926 on the target physical host may create a sub process "Agent node D" 928 for virtual host D if no sub process for this host name exists

FIG. 10

DIAGNOSTICS AGENTS FOR MANAGED COMPUTING SOLUTIONS HOSTED IN ADAPTIVE ENVIRONMENTS

CROSS REFERENCE TO RELATED APPLICATIONS

This application claims the benefit of U.S. Provisional Application No. 61/595,608 filed Feb. 6, 2012 and titled "Diagnostics Agents for Managed Computing Solutions Hosted in Adaptive Environments", which application is incorporated by reference in its entirety herein.

TECHNICAL FIELD

This description relates to hosted computing solutions integrated in an adaptive computing environment.

BACKGROUND

Computing solutions or applications (e.g., business applications such as SAP Enterprise Portal, SAP ERP, etc.) are commonly installed on host computer systems. Each host computer system's infrastructure may consist of one or more physical machines, virtual machines, central processing units, disk drives and other resources, distributed over diverse locations or nodes connected by a network.

To ensure reliable availability of the computing solutions to users, the host computer systems may be deployed in adaptive environments. Further, critical solutions may be hosted on load-balancing computer clusters (i.e. in which cluster-nodes may, for example, share computational workload to provide better overall performance).

In an adaptive environment, hosting of a computing solution or application on a host computer system's infrastructure, which may include several physical computers, can be monitored and managed using vendor provided solutions (e.g., by an "adaptive controller"). The adaptive controllers provide a bridge between infrastructure and instances of the computing solution or application. In case of failure of a component (e.g., hardware failure, network link failure, etc.) in one physical host computer, the managed solution or application may be relocated and restarted on a different physical host computer. The adaptive controller may also relocate a managed solution or application from a host to other physical resources to mitigate high load situations or for maintenance purposes.

Conventional hosting systems in the industry have infrastructure components (e.g., physical computers and other hardware) sourced from specific vendors. Solutions managers or adaptive controller implementations in such hosting systems are customized for the physical computers or hardware provided by the specific vendors. The solutions manager or adaptive controller implementations are usually not transferable from one vendor-type hosting system to another vendor-type hosting system.

Consideration is now being given to solutions managers or adaptive controller configurations that can be interchangeably deployed over diverse types of hosting system infrastructures.

SUMMARY

A solutions manager is provided for computing solutions or applications that are hosted on one or more physical and/or virtual machines in an adaptive computing environment. The solutions manager includes at least one process or agent to support, monitor, diagnose or enable the computing solutions or applications. At least one process or agent is disposed on the physical and/or virtual machines hosting the managed computing solutions or applications. When a computing solution or application is relocated from a first host to a second host, for example, in failover or switchover situation, remote processes or agents associated with the computing solution or application are also automatically relocated from the first host to a second host. The automatic relocation of an agent associated with the relocated computing solution or application is accomplished by deleting the agent on the first host and recreating it on the second host.

In one general aspect, a method includes providing, at a central location, a solutions manager configured to monitor or support one or more computing solutions that are hosted on at least one host in an adaptive computing environment by utilizing agents agent disposed on the at least one host. The method further includes providing, on a first host on which an instance of a particular computing solution is running, a remote diagnostics agent that is communicatively linked to the solutions manager and associated with the particular computing solution, and in response to a relocation of the instance of the particular computing solution from the first host to a second host in the adaptive computing environment, automatically relocating the remote diagnostics agent that is communicatively linked to the solutions manager and associated with the particular computing solution from the first host to the second host.

In one general aspect, a system includes a solutions manager configured to monitor or support at least one computing solution that is hosted on one or more physical and virtual hosts in an adaptive computing environment. For this purpose, the system utilizes at least one remote/diagnostic process agent disposed on the at least one host. Each host has at least one instance of a remote agent. Each remote agent instance is defined by a system identification (SID) and an instance number, and each virtual host on a physical host is uniquely associated with a single agent instance.

The system also includes a remote host agent and an agent node controller process disposed on a physical host in the adaptive computing environment. The remote host agent is configured to monitor virtual host names on the physical host. The agent node controller disposed on the physical host is communicatively linked to the host agent and configured to the detect additions and deletions in the virtual host names on the physical host. The agent node controller creates a new agent node for a newly added virtual host name and deletes the agent node associated with a deleted virtual host name.

In one general aspect, a computer program product embodied in non-transitory computer-readable media includes executable code, which when executed, supports at least one computing solution that is hosted on at least one host in an adaptive computing environment by utilizing at least one remote process agent disposed on the at least one host. The executable code when executed further provides, on a first host on which an instance of a particular solution is running, a remote diagnostics agent that is communicatively linked to the solutions manager and associated with the particular solution. The executable code when executed, in response to a relocation of the instance of the particular solution from the first host to a second host in the adaptive computing environment, automatically relocates the remote diagnostics agent that is communicatively linked to the solutions manager and associated with the particular solution from the first host to the second host.

BRIEF DESCRIPTION OF THE DRAWINGS

FIG. 8 is a flow chart of an example re-initialization or post-relocation preparation process, in accordance with the disclosed subject matter.

FIG. 10 is a flow chart of an example process for agent creation, in accordance with the disclosed subject matter.

Like reference symbols in the various drawings indicate like elements.

Figure 1A:
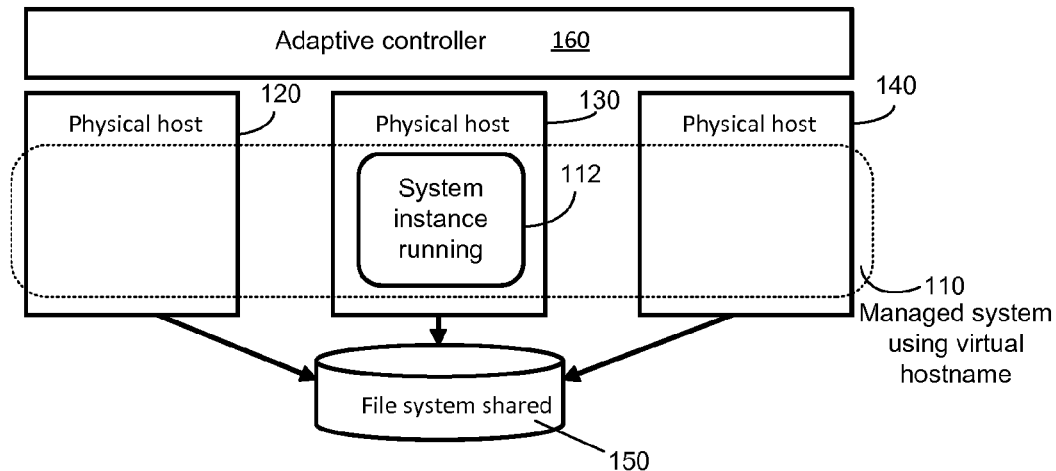
FIG. 1A is a block diagram schematically illustrating a hosting arrangement for a computing solution or application on multiple servers or computers.

The details of one or more implementations are set forth in the accompanying drawings and the description below. Other features will be apparent from the description and drawings, and from the claims.

DETAILED DESCRIPTION

In accordance with the principles of the disclosure herein, a managing system manages a computing solution or application ("a managed system") that is hosted on one or more physical and/or virtual computers or hosts that are integrated in an adaptive computing arrangement. An example managing system includes a solutions manager diagnostic (SMD) unit hosted on a server external to the adaptive computing arrangement. The managing system may have a remote diagnostic process or agent (SMD agent) associated with the computing solution or application. An instance of the remote diagnostic process or agent may be installed on a current first host of the computing solution or application. The remote diagnostic agent may be in communication with and supervised by the SMD. When the computing solution or application is moved from the first host to a second host, the remote diagnostic agent is also automatically moved from the first host to the second host. This co-move preserves continuity in computing solution or application operations from the first host to a second host.

For convenience in description, the following terminology is adopted herein:

Managed System—A managed system is a system including hosted computing solutions or applications (e.g., a business application, SAP Enterprise Portal, SAP ERP, etc.). The managed system may be hosted on computer infrastructure that may include physical machines or virtual machines sourced from different vendors and/or distributed across diverse locations. A computing solution or application in the managed system may be also, for brevity, referred to as the managed system.

Managing System—A managing system is a system hosting a solutions manager (including, for example, solution management tools) for monitoring and managing operations of the managed system.

Remote Agent/Diagnostics Agent—A remote agent is a process responsive to incoming requests or instructions. In order to monitor or communicate with a managed system, the managing system must connect to a remote agent running on each physical or virtual machines.

Agelet—An agelet is a component or plug-in of the remote agent. The agelet component may execute dedicated tasks by exposing remote services according to a scenario a user may want on the remote agent. Each agelet may have a configuration which typically consists of a set of files (xml, properties).

Agent nodes may be SMD agents. In particular, agent nodes may be a plurality of SMD agents running under a common systems identification (SID) and instance number. The agent nodes may be isolated into different processes controlled by the same shared instance. A diagnostics agent node installation may, for example, in a case of one physical host and N virtual hosts, use the following approach: a dedicated SID, a dedicated instance number, and N+1 agent nodes, (e.g., a set of diagnostics agents) with one agent node representing the physical host, and N agent nodes representing N virtual hosts in one-to-one correspondence. Each agent node may have a dedicated configuration and a dedicated virtual host name. A diagnostic agent with a node feature may be installed only on a local folder or local partition of the physical host.

With this approach, the number of instances dedicated to a set of diagnostics agents does not depend on the number of managed systems/virtual hosts. Further, with this approach one or a few SID(s) and instance number(s) may be utilized or dedicated to a large number of SMD agents on large hosting systems without limitations. Agent nodes may share binaries (e.g., SAP Kernel and Java virtual machine (JVM) binaries).

An agelet or agent node controller may facilitate automatic installation, start, stop, move, and removal of the diagnostics agents when relocation occurs for any reason, for example, from the first host to the second host. The agent node controller, which is installed on a physical host, may monitor logical hosts installed on the physical host. The agent node controller may automatically add and create agent nodes to represent new logical hosts on the physical host. The agent node controller may automatically remove agent nodes, for example, when a corresponding logical host is removed from the physical host.

FIG. 1A shows a conventional arrangement 100 for hosting computing solutions or applications ("managed system 110") on multiple servers or computers (e.g., physical hosts 120, 130, 140) that are integrated in an adaptive environment and share a common data store, disk or folder (e.g., file system 150). Physical hosts 120, 130, 140 operations may be monitored and managed by an adaptive controller 160. Adaptive controller 160 may be configured, using vendor solutions, for handling adaptive, failover, and high availability situations.

In hosting arrangement 100, managed system 110 may be assigned a virtual host name by which it can be addressed in operation. FIG. 1A shows an instance 112 of the computing solution or application in managed system 110 running on physical host 130. A vendor-provided solution (e.g. adaptive controller 160) may be configured to switch or relocate the computing solution or application and restart it on a different physical host computer to avoid interruption of solution or application operation. Adaptive controller 160 may be configured to switch or relocate the computing solution or application in system 110 from one host computer to another on instruction (e.g., by a system administrator) or automatically in response to a component failure in a host computer. (e.g., physical host 130).

Figure 1B:
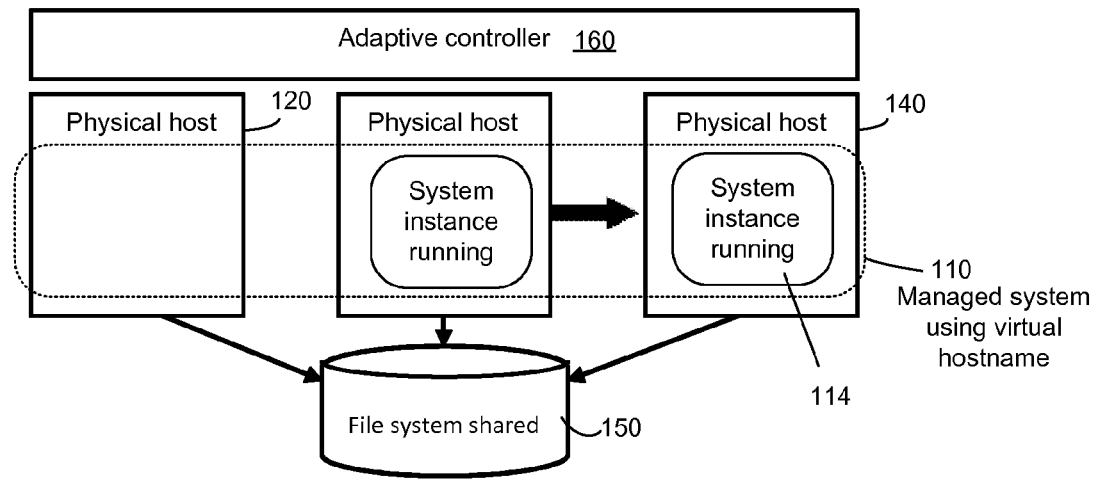
FIGS. 1B and 1C are block diagrams illustrating relocation of the computing solution or application of FIG. 1A from one host to another host.
Figure 1C:
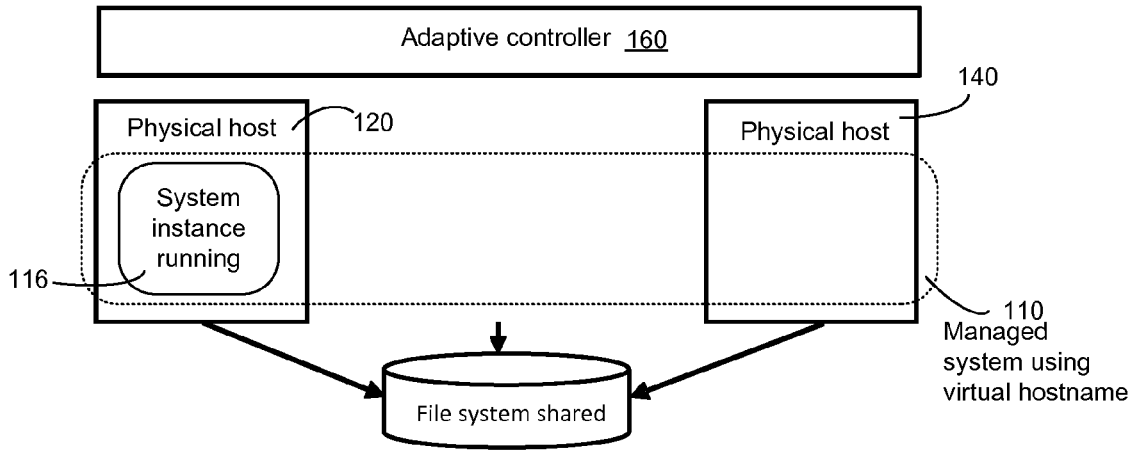

FIGS. 1B and 1C show examples where adaptive controller 160 has relocated (e.g., on instructions from an administrator and in a failover situation, respectively) the computing solution or application from physical host 130 and restarted it on a different physical host computer. In particular, FIG. 1B shows an instance 114 of the relocated computing solution or application on physical host 140, and FIG. 1C shows an instance 116 of the relocated computing solution or application on physical host 120.

A managing system including suitable solution management tools ("solutions manager") may be provided for monitoring and managing operations of managed system 110. Different configurations or architectures for handling adaptive, failover, or high availability (HA) situations may be available for hosting implementation 100 of managed system 110, for example, according to the types of infrastructure hardware used for hosting. However, all configurations or architectures at least require that managed system 110 components must be installed on a virtual host to abstract the installation of the physical host server, and that managed components' binaries must lie on a shared file system accessible by each physical host server or computer. All hosting configurations or architectures also require integration of the managing system and a product start-up sequence.

Figure 1D:
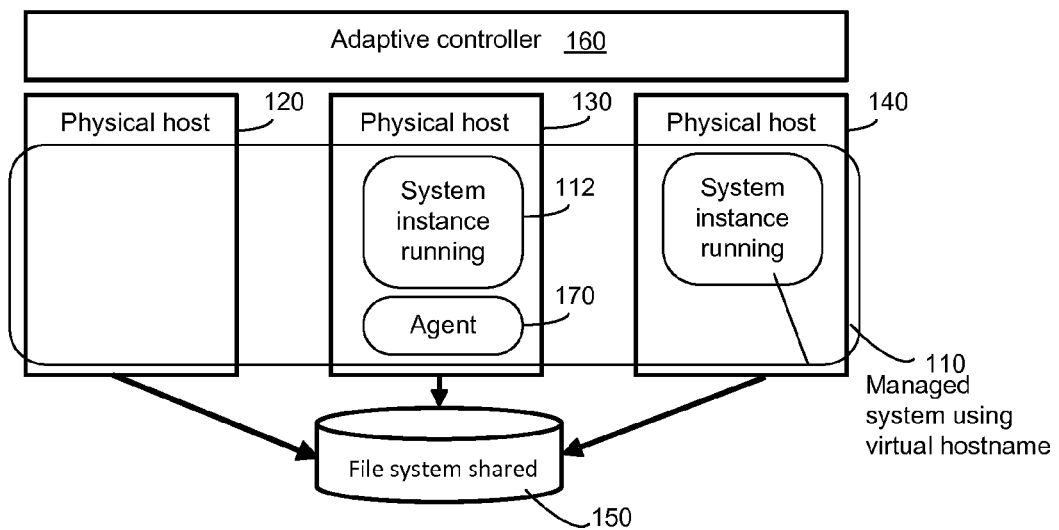
FIG. 1D is a block diagram schematically illustrating placement of an agent on a physical host to support, monitor, or diagnose a computing solution or application instance running on a physical host.

In the managing system, a product start-up sequence may be provided by a remote process or agent. FIG. 1D shows an example remote agent 170 disposed on physical host computer 130. Integration in the adaptive computing environment requires installation of remote agent 170 on a shared file system (host 130 and managing system) and adding start-up procedures for remote agent 170 into the relocation or failover procedures for the managed system.

To integrate the remote agent instance, detailed knowledge of the agent and start-up sequences may be required. Integration of remote agent 170 may have to be tested for all scenarios of operation (e.g., failover, switch-over, etc.). In some situations, installation of remote agent 170 into a critical managed system failover sequence (e.g., relocation from host 130 to host 120, FIG. 1C) risks creating additional unexpected "noise" (e.g., crash or blocking situations) during the relocation of the managed system. Vendor solutions for a critical managed system failover sequence in a hosting arrangement must account for an additional component (i.e. remote agent 170), which may increase costs.

Figure 2:
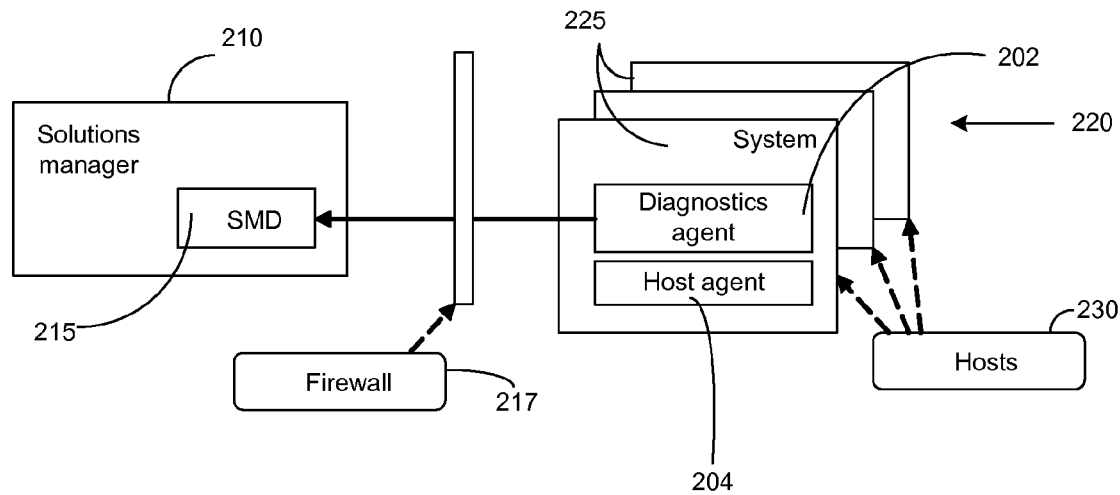
FIG. 2 is a schematic block diagram illustration of a managing system, in accordance with the disclosed subject matter.

In accordance with the principles of the disclosure herein, FIG. 2 shows an example architecture or implementation of a managing system 200 for a managed system 220 hosted on one or more hosts (e.g., hosts 230) in an adaptive computing environment. The managed system 220 hosts may be physical or virtual machines. Managed system 220 may, for example, be one or more business processes or applications 225 running on the physical or virtual machines. Managing system 200 may include one or more remote agents (e.g., a remote/diagnostics agent 202 and a host agent 204), which are disposed on each host.

Managing system 200 may include a solutions manager 210, which may further include or host a solutions manager diagnostics process (SMD) 215. SMD 215 may, for example, be a server coupled to the remote agents (e.g., a remote/diagnostics agent 202 and a host agent 204) that may be disposed on each host. SMD 215 may be configured to connect (e.g., through a firewall 217) to the remote agents to provide end-to-end root cause analysis and central administration features.

Solutions manager 210 may be configured so that, in operation, every time remote/diagnostics agent 202 establishes a connection to SMD 215, remote/diagnostics agent 202 receives the latest binaries and configuration information, and executes different tasks (e.g., on demand or batch tasks) including collecting information on server solution manger scenarios.

The configuration information may be stored individually for each agent with a key called "server name." The key may be uniquely defined for each agent during setup of solutions manager 210. The key may represent the logical host name of managed system 220, which the agent monitors and collects information on.

Figure 3:
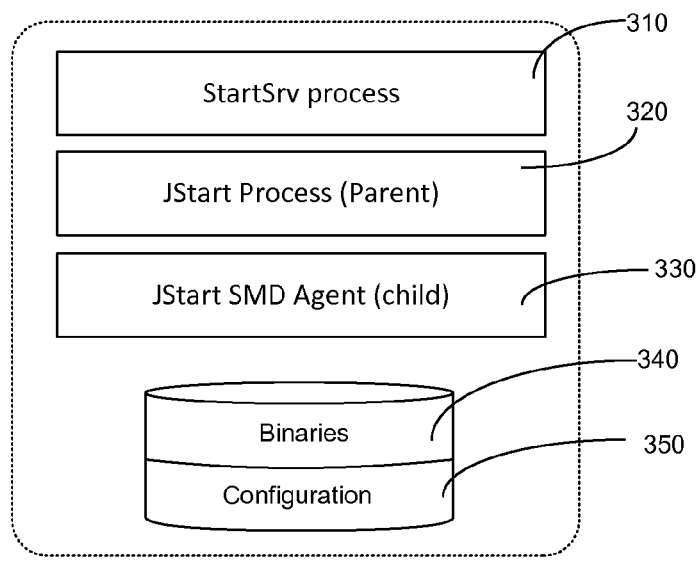
FIG. 3 is a schematic block diagram illustration of an agent and its sub processes, in accordance with the disclosed subject matter.

An agent instance may be standard instance identification (SID and instance number). FIG. 3 shows an example agent instance 300, which in addition to binaries 340 and configuration 350 data stores, includes, for example, process components: StartSrv process 310, JStart Process (Parent) 320, and JStart SMDAgent (child) 330, The architecture of managing system 200 may allow it to run outside of any vendor provided-solutions or environment for integration of hosts 230, but may be configured to allow managing system 200 to react in the same manner as vendor-provided solutions, for example, for switch-over, failover, and high availability scenarios.

Figure 4:
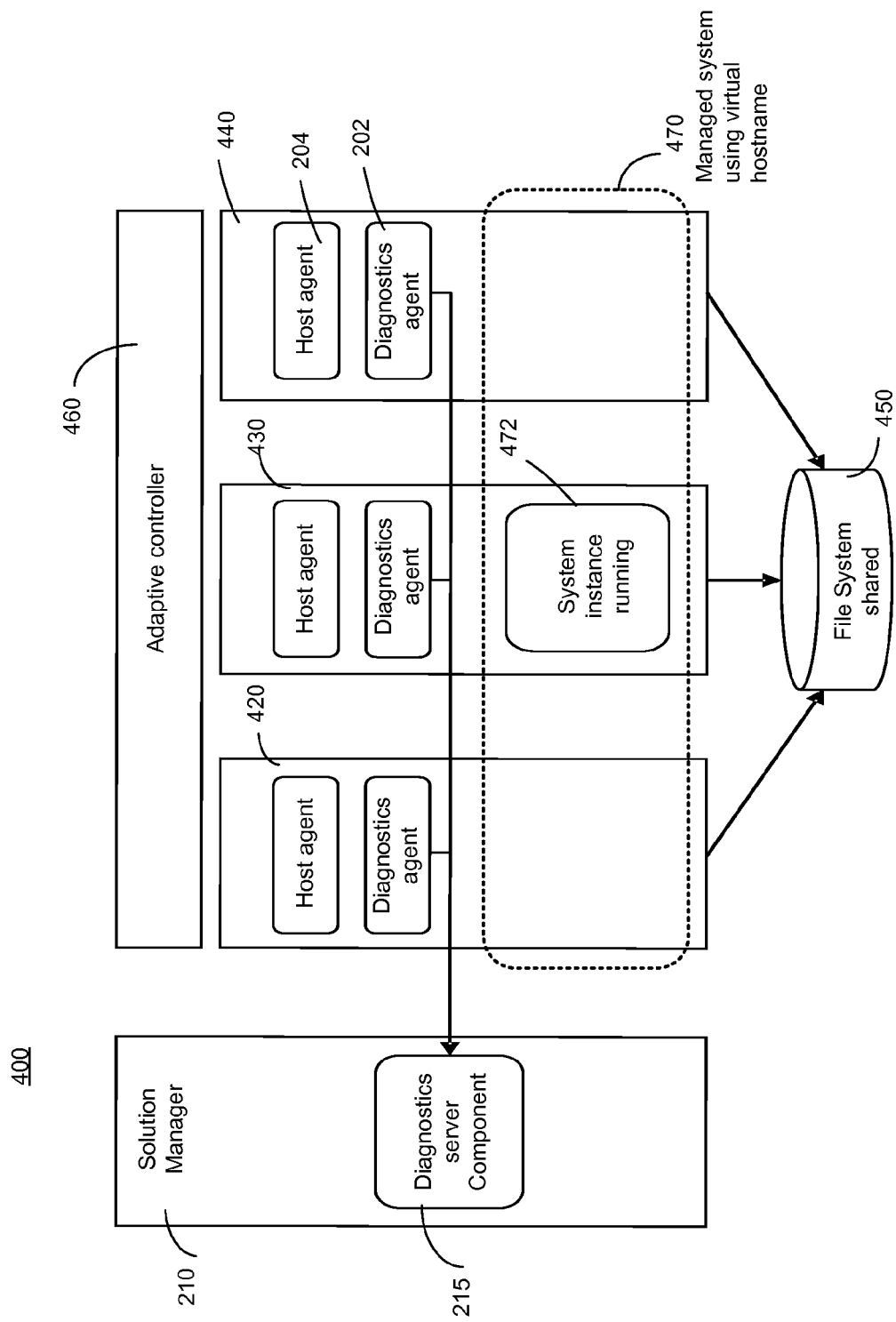
FIGS. 4, 5, and 7 are block diagrams schematically illustrating a generic implementation of a managing system for a switch-over scenario in an adaptive computing environment, in accordance with the disclosed subject matter.

FIG. 4 shows an example generic implementation 400 of managing system 200 for a switch-over scenario in an adaptive computing environment having computing resources established or managed by vendor solutions (e.g., adaptive controller 460). FIG. 4 shows a managed system 470, which uses a virtual host name, hosted on a group of physical hosts 420-440. Physical hosts 420-440 may be integrated in an adaptive computing environment using, for example, adaptive controller 460. FIG. 4 further shows, for example, an instance 472 of managed system 470 running on physical host 430.

In example implementation 400, remote/diagnostics agents 202 may be installed next to a host agent 204 on each physical server 420-440, which belong the resource group managed by the vendor environment. Diagnostics agents 202 may be installed on each physical server 420-440 in a local file system, which is always available independent of relocation processes that may occur on physical servers 420-440. A diagnostics agent 202 installed on a physical host may be referred to herein as an "agent node controller."

Host agent 204 on each physical server may be configured to monitor host name changes. Remote/diagnostics agent 202 may listen on host name changes in each physical server (e.g., hosts 230) monitored by host agent 204. Solutions manager 210 may allow remote/diagnostics agent 202 to manage the relocation event of managed system 220 by listening for host name changes on each physical server. Upon a relocation event, remote/diagnostics agent 202 may be configured to automatically create a dedicated agent sub-process or child process (hereinafter "agent node") on the physical server to which the managed system has been relocated.

An agent node process may be configured to automatically detect a logical host move and initiate the creation or deletion of a new agent sub-process (agent node) on both the source and target physical servers of the relocated managed system.

The newly created agent node may be configured to automatically connect to and download its configuration from solutions manager 210. In this manner, all aspects (e.g., runtime and behavioural aspects) of agent nodes may be preserved through relocation, and when restarted, the newly created agent node may behave in exactly the same manner as when it was running on the source physical server.

An example agent configuration for handling adaptive environments downloaded from solutions manager 210 may include the following elements:

Enabling/disabling the agent node controller

Switch to use a negative or positive filter for watching or monitoring host names A list of managed systems that should be positively monitored for the relocation.

Figure 5:
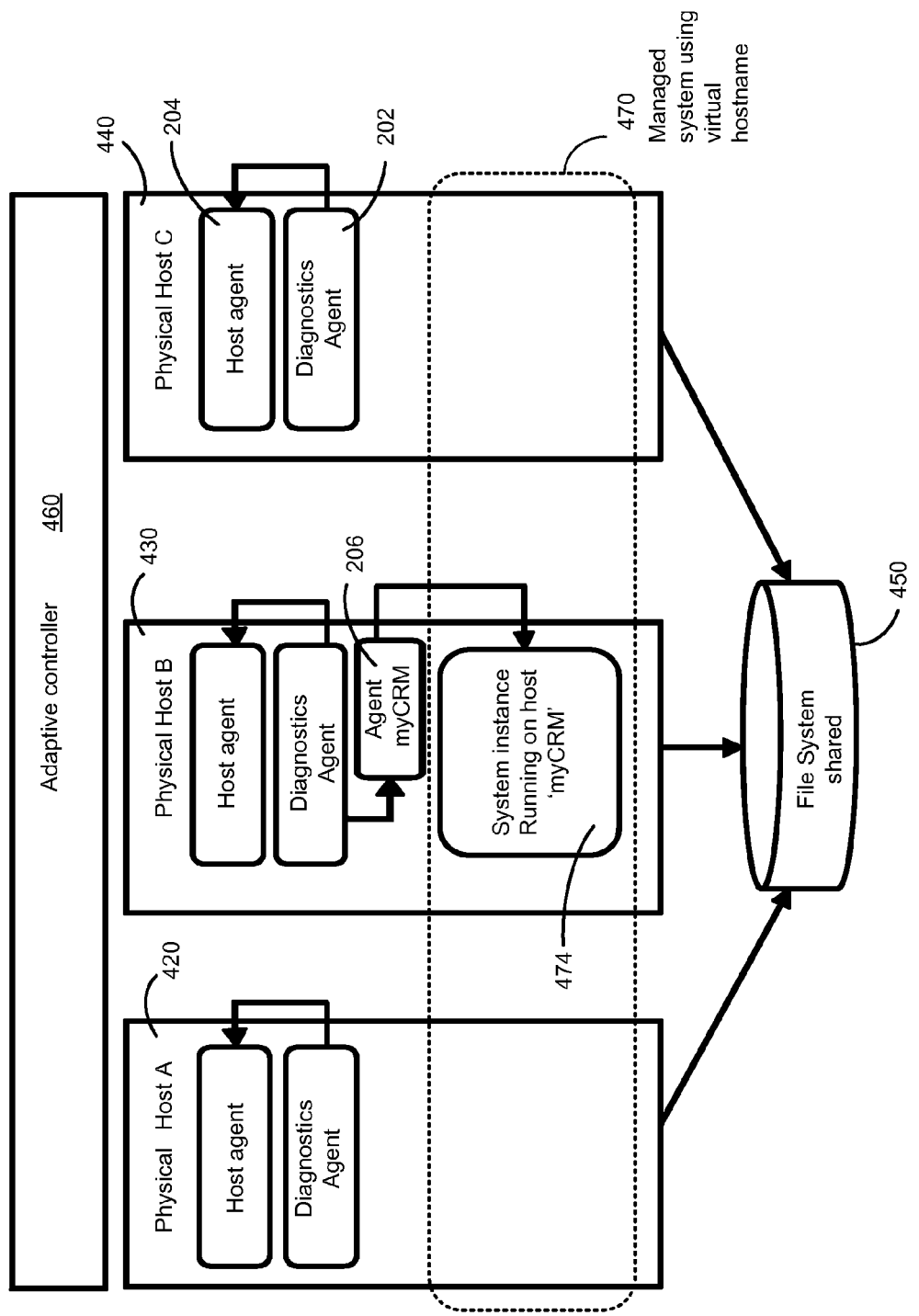
Figure 7:
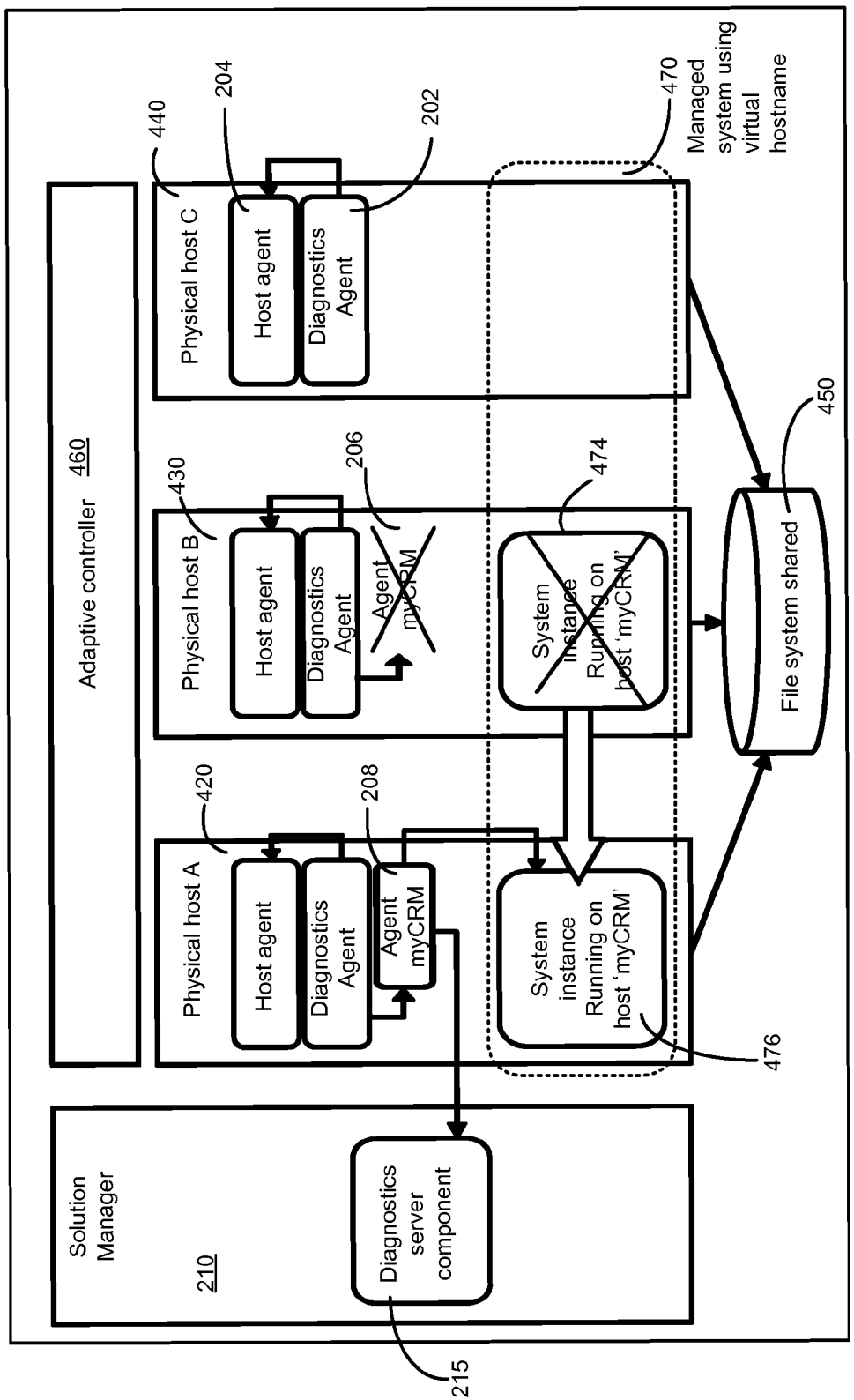

A pulling or polling frequency for retrieving a current virtual host name list from the host agent FIGS. 5 and 7 show example managed system relocations in a switch-over scenario, with reference to generic implementation 400 of managing system 200 shown in FIG. 4.

FIG. 5 shows an example instance 474 of managed system 470 running on physical host 430 before a move or relocation. It will be understood that in the adaptive environment, system instance processes may be distributed over several resources. For example, instance 472 on physical host 430 as shown in FIG. 4 may be running as instance 474 on virtual host 'myCRM' on physical host 430 as shown in FIG. 5.

FIG. 7 shows an example instance 476 running on virtual host 'myCRM' on physical host 420 after a move or relocation of instance 474 from physical host 430 (FIG. 5).

For initialization or preparation for relocation, agent node controllers (e.g., diagnostic agents 202) running on each of physical servers 410-430 may ask their respectively associated host agents 202 for the list of names of virtual hosts on their respective physical servers. Once this list of virtual host names is retrieved, an agent node controller may check the list for changes (i.e. for addition or deletion of a virtual host name) therein.

If a change is detected, the agent node controller may send an internal process requesting creation or deletion of an agent node (sub process) corresponding to the added or deleted virtual host name, respectively.

Figure 6:
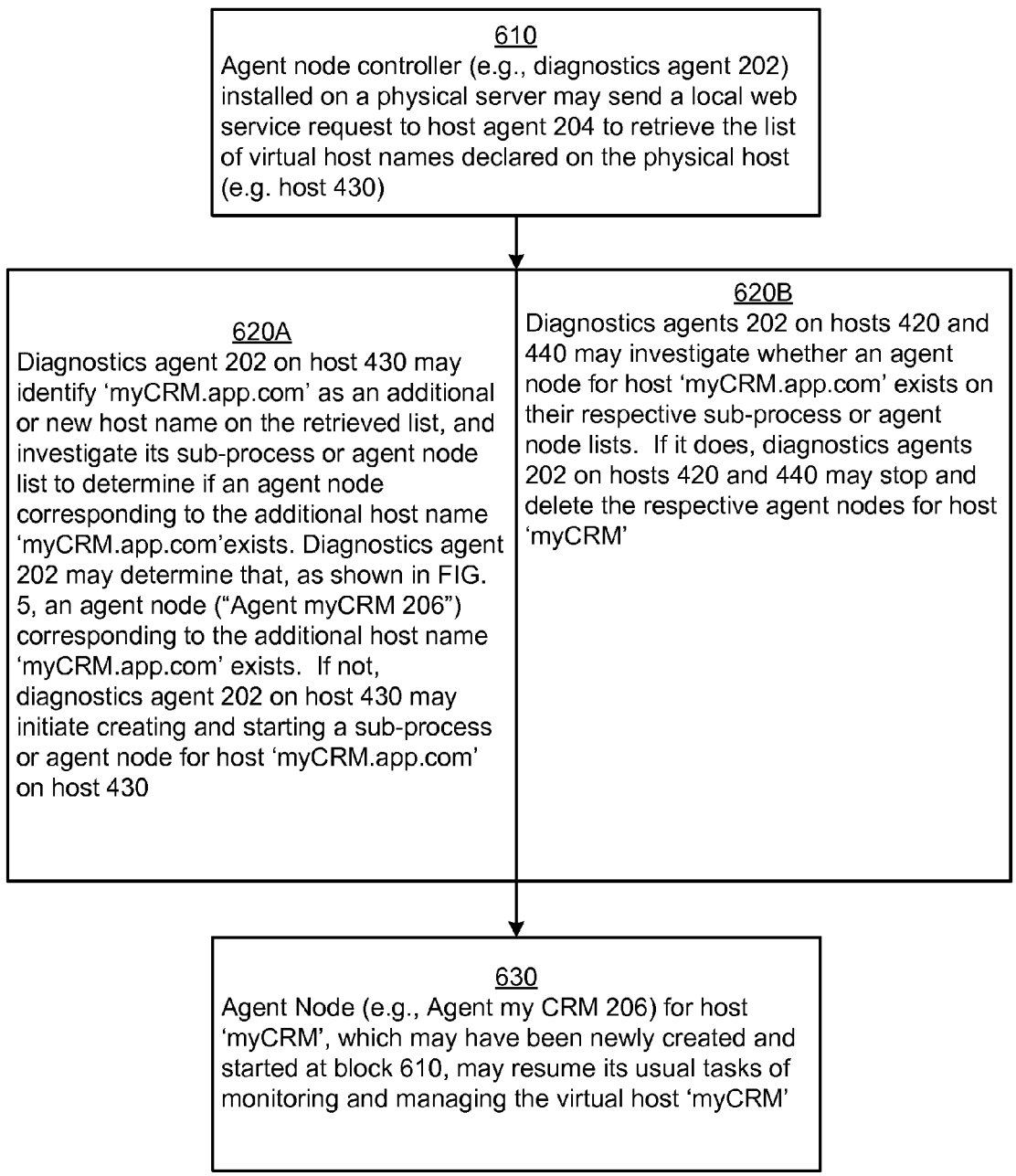
FIG. 6 is a flow chart of an example initialization or relocation preparation process, in accordance with the disclosed subject matter.

With continued reference to FIG. 5, FIG. 6 shows an example initialization or relocation preparation process 600. In process 600, at block 610, each agent process "agent node controller" (e.g., diagnostics agent 202) installed on a physical server may send a local web service request to host agent 204 to retrieve the list of virtual hostnames declared on the physical host (e.g. host 430). The agent node controller may send the request periodically, for example, every 45 seconds. In response, for example, diagnostics agent 202 on host 420 may retrieve the list: "hostA.domain.com", diagnostics agent 202 on host 430 may retrieve the list: "hostB.domain.com, myCRM.app.com", and diagnostics agent 202 on host 440 may retrieve the list: "hostC.domain.com" (FIG. 5).

At block 620A, diagnostics agent 202 on host 430 may identify 'myCRM.app.com' as an additional or new host name on the retrieved list, and investigate its sub-process or agent node list to determine if an agent node corresponding to the additional host name 'myCRM.app.com'. Diagnostics agent 202 may determine that, as shown in FIG. 5, an agent node ("Agent myCRM 206") corresponding to the additional host name 'myCRM.app.com' exists on host 430. If it does not exist, diagnostics agent 202 on host 430 may initiate creating and starting a sub-process or agent node for host 'myCRM.app.com' on host 430.

At block 620B, diagnostics agents 202 on hosts 420 and 440 may investigate whether an agent node for host 'myCRM.app.com' exists on their respective sub-process or agent node lists. If it does, diagnostics agents 202 on hosts 420 and 440 may stop and delete the respective agent nodes for host 'myCRM'.

Further in process 600, at block 630, agent node (e.g., Agent my CRM 206) for host 'myCRM' on host 430, which may have been newly created and started at block 610, may resume its usual tasks of monitoring and managing the virtual host 'myCRM.'

FIG. 8 is an example process flow of re-initialization or post-relocation preparation process 800, which is described with reference to FIG. 7.

In process 800, at block 810, like at block 610 in process 600, each agent node controller (e.g., diagnostics agent 202) installed on a physical server sends a web service request locally to host agent 204 to retrieve the list of virtual host names declared on the physical host (e.g. host 430) periodically (e.g., every 45 seconds). For example, with reference to FIG. 7, diagnostics agent 202 on host 420 may retrieve the list: "hostA.domain.com, myCRM.app.com," diagnostics agent 202 on host 430 may retrieve the list: "hostB.domain.com," and diagnostics agent 202 on host 440 may retrieve the list: "hostC.domain.com."

At block 820A, diagnostics agent 202 on host 420 may identify 'myCRM.app.com' as an additional host name on the retrieved list, and investigate its sub-process or child process list to determine if a corresponding agent node (e.g., Agent myCRM 208, FIG. 7) exists. If not, diagnostics agent 202 on host 420 may create and start a sub-process or agent node (e.g., Agent myCRM 208) for host 'myCRM' on host 420.

At block 820B, diagnostics agent 202 on hosts 430 and 440 may investigate whether an agent node for host 'myCRM' exists on their respective sub-process or agent node lists. If it does, diagnostics agents 202 on hosts 420 and 440 may stop and delete the agent node for host 'myCRM' if it exists on hosts 420 and 440, respectively. FIG. 7 shows an example where diagnostics agent 202 on host 430 may delete Agent myCRM 206 corresponding to the relocated instance 474 (FIG. 5).

At block 830, Agent myCRM 208 for host 'myCRM,' which may have been a newly created agent node and started at block 820A, may connect to solutions manager 210 and resume it tasks of diagnosing and monitoring virtual host 'myCRM' on host 420.

In processes 600 and 800 (FIGS. 6 and 8), creation or deletion of agent nodes (e.g., at blocks 620A and 820A) may involve modification of internal structure at process and file level in an adaptively integrated computing system (e.g., system 400, FIG. 4).

Figure 9A:
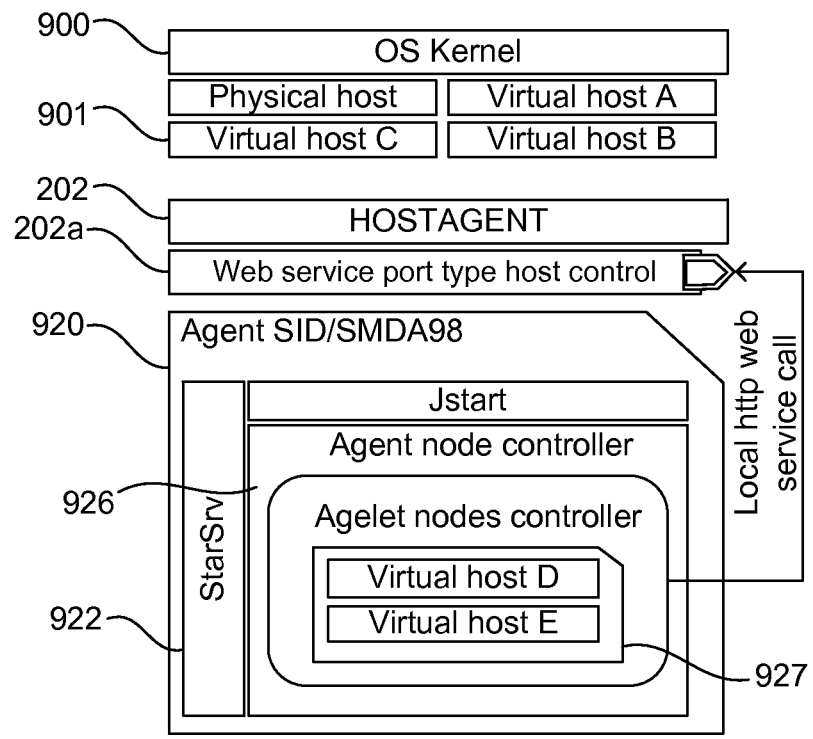
FIGS. 9A-9C are block diagrams of example file structures of an operating system (OS) kernel of an adaptive computing system, a host agent, and an agent, in accordance with the disclosed subject matter.

FIG. 9A shows an example block diagram of the structures of an operating system (OS) kernel 900 of a physical host, host agent 202 and agent 920 (e.g., Agent SID/SMDA98) instances that are disposed on the physical host. OS kernel 900 includes a configuration list 901 of physical and virtual hosts in the computing system. List 901 as shown in FIG. 9A, for example, includes host names "Physical host" and "Virtual host A', "Virtual Host B", and "Virtual Host C". Host agent 202 may configured to monitor physical and virtual host names in configuration list 901 of OS kernel 900. Host agent 202 may include a communication port (a Web service port type host control 202a). Agent 920 (SID/SMDA98) includes process 922 (e.g., StartSrv 302, FIG. 3), process 924 (e.g., JStart parent of sub process 304, FIG. 3), and process 926 (e.g., agent node controller 926). Agent node controller 926 may be configured to maintain a list of monitored hosts 927, and further configured to periodically receive updated information on hosts names in OS kernel 900's configuration list 901 (e.g., via periodic local web service calls to host agent 202). Agent node controller 926 may compare the received information on host names in list 901 with list of monitored hosts 927 to detect any changes in the virtual hosts on the system.

Figure 9B:
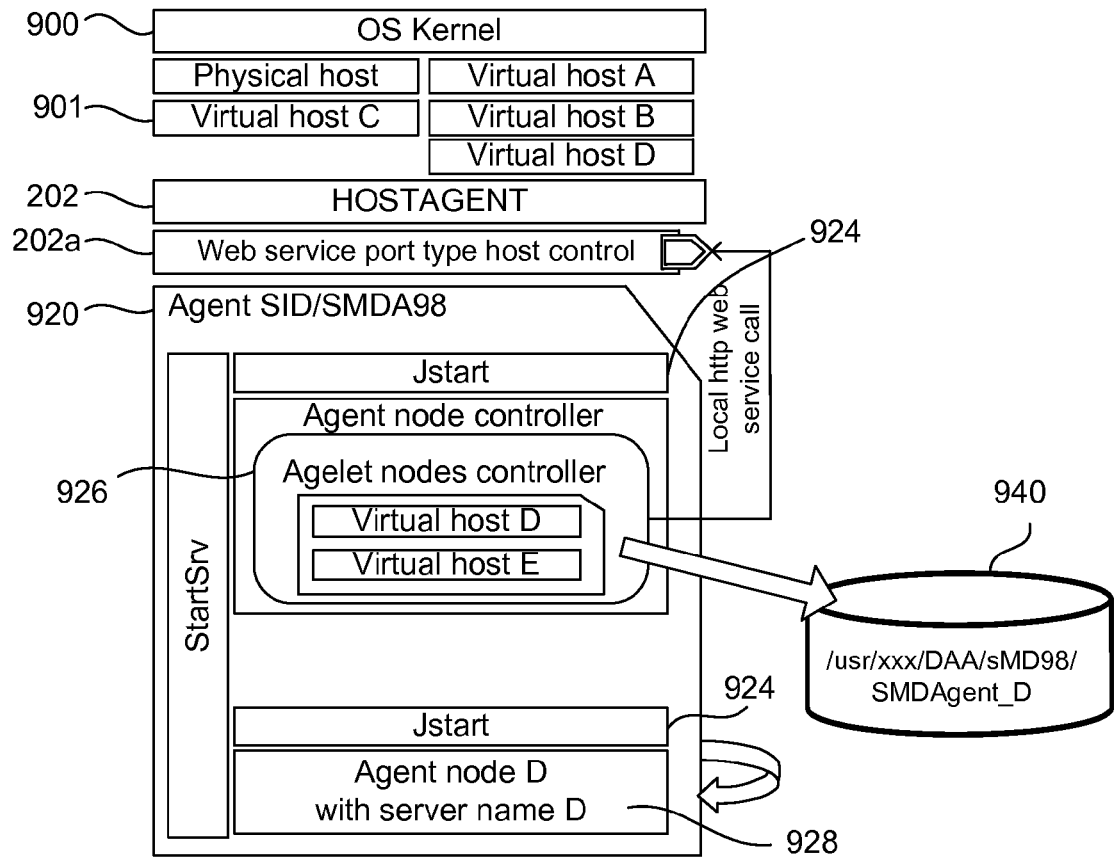

FIG. 9B is an example showing the detection of new virtual host by agent node controller 926, and creation of an agent node corresponding to the new virtual host. When a new virtual host "D" is hosted on the system, the system may enter or declare the name "Virtual Host D" in OS kernel 900's configuration list 901 of physical and virtual hosts in the computing system. Agent node controller 926 may find this new entry for Virtual host D in list 901, and if no agent node is associated with virtual host D, it may automatically create a corresponding agent node on the fly. Agent node controller 926 may dynamically create the agent node (e.g., agent node D 928) corresponding to virtual Host D, and log the creation of agent node D 928 in shared file system directory 940 (i.e. a copy of node controller directory without binaries and configuration data). Agent node D 928 may then be declared to be the new process for Jstart Parent process 924. Agent node D 928 may then restart agent 920 instance SID/SMDA98.

Figure 9C:
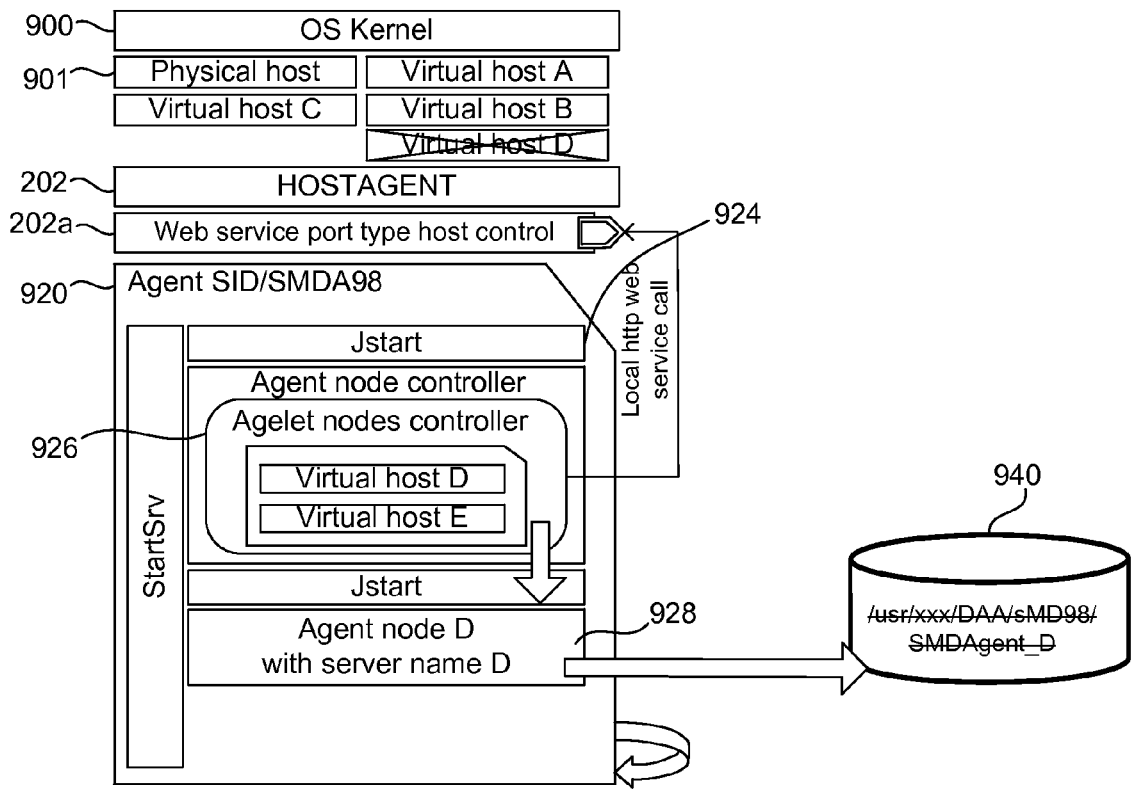

FIG. 9C is an example showing the detection of a virtual host relocation by agent node controller 926, and agent node removal with reference to the structures of OS kernel 900, host agent 202 and agent 920 shown in FIG. 9A. When an existing virtual host "D" is relocated away from the system, the system deletes its name "Virtual host D" from OS kernel 900's configuration list 901 of physical and virtual hosts in the computing system. Agent node controller 926 detects the deletion of the name Virtual host D and if an agent node (e.g., agent node D 928) is associated with virtual host D, it stops the agent node and deletes its corresponding entry (e.g., SMDAgent_D) from file system directory 940. Then, agent node controller 926 restarts agent 920.

FIG. 10 shows an example process 1000 for agent creation (e.g., of agent node D 928 for a new virtual host D). Process 1000 is described herein with reference to FIGS. 2, 8 and 9A-B.

In process 1000, at block 1010, when a managed system (e.g., system 470, FIG. 4) is relocated from a source physical host to a target physical host (e.g., as in FIG. 8), the name of the virtual host (e.g., Virtual host D) of the managed system may be declared into the OS kernel configuration list 901. At block 1020, a virtual host move may be detected on the physical hosts on which process agent node controller 926 is running (e.g., at blocks 820A and 820B, FIG. 8). At block 1030, agent node controller 926 on the target physical host may create a sub process "Agent node D" 928 for virtual host D if no sub process for this host name exists. Agent node D 928 connection settings for connection to solutions manager 210 may be inherited from agent node controller 926, which is already connected to solutions manager 210.

The foregoing creation sequence generates a clone of agent node controller 926 on file system 940 (i.e. a copy of node controller directory without binaries and configuration) in solutions manager 210. The clone is declared to be the new process to Jstart Parent process. All agent configurations are managed centrally by SMD server 215 and stored centrally in an engine database of solutions manager 210.

The clone receives a dedicated key "server name" which may be the same as the monitored virtual hostname (i.e. virtual host D). When the new agent node is started, it will connect to solutions manager 210 with its "server name" key, and will receive the binaries, the diagnostics configuration and monitoring tasks for the virtual host D.

A process agent deletion may be performed in manner similar to process 1000 for agent creation. For example, when virtual host D is removed from OS configuration list 901, agent 920 detects the change and removes the dedicated sub process (e.g., agent D 928) for virtual host D, from the Jstart parent process configuration.

The various systems, apparatus or techniques described herein may be implemented in digital electronic circuitry, or in computer hardware, firmware, software, or in combinations of them. The systems, apparatus and techniques may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems, apparatus or techniques may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method, comprising:
   providing, at a central location, a solutions manager configured to monitor and support at least one computing solution that is hosted under a virtual hostname on one or more physical hosts in an adaptive computing environment by utilizing at least one remote process agent disposed on the one or more physical hosts;
   providing, on a first physical host on which an instance of a particular computing solution is running under a particular virtual hostname, a remote diagnostics agent that is communicatively linked to the solutions manager and associated with the particular computing solution;
   listening for virtual hostname changes on the first physical host and a second physical host; and
   in response to a relocation of the instance of the particular computing solution running under the particular virtual hostname from the first physical host to the second physical host in the adaptive computing environment,
   automatically relocating the remote diagnostics agent that is communicatively linked to the solutions manager and associated with the particular computing solution from the first physical host to the second physical host.

2. The method of claim 1, wherein automatically relocating the remote diagnostics agent that is communicatively linked to the solutions manager and associated with the particular computing solution from the first physical host to the second physical host includes:
   deleting the remote diagnostics agent associated with the particular computing solution on the first physical host, and recreating the remote diagnostics agent associated with the particular computing solution on the second physical host.

3. The method of claim 1, wherein providing, at a central location, a solutions manager configured to monitor and support at least one computing solution that is hosted under a virtual hostname on one or more physical hosts in an adaptive computing environment by utilizing at least one remote process agent disposed on the one or more physical hosts, includes:
   providing a solutions manger diagnostic (SMD) unit to supervise the one remote process agent.

4. The method of claim 3, wherein providing, at a central location, a solutions manager configured to monitor and support at least one computing solution that is hosted under a virtual hostname on one or more physical hosts in an adaptive computing environment by utilizing at least one remote process agent disposed on the one or more physical hosts, includes:
   providing a plurality of SMD agents running on at least one physical host under a one system identification (SID) associated with the particular computing solution running under a particular virtual hostname, and one instance number.

5. The method of claim 4, wherein providing a plurality of SMD agents running on the at least one physical host under the one system identification number (SID) associated with the particular computing solution running under a particular virtual hostname of a target system, and one instance number includes:
   providing one agent representing the at least one physical host and one or more agents representing virtual hosts on the at least one physical host in one-to-one correspondence.

6. The method of claim 3, wherein providing, at a central location, a solutions manager configured to monitor and support at least one computing solution that is hosted under a virtual hostname on one or more physical hosts in an adaptive computing environment by utilizing at least one remote process agent disposed on the one or more physical hosts, includes:
   providing a process agent node controller on the one or more physical hosts to facilitate automatic installation, start, stop, move, and removal of a remote process agent associated with a host.

7. The method of claim 6, wherein providing a process agent node controller, further comprises, monitoring logical hosts installed on the one or more physical hosts.

8. The method of claim 7, wherein monitoring logical hosts installed on the one or more physical hosts, further comprises, automatically creating new process agent nodes to represent new logical hosts on the one or more physical hosts.

9. The method of claim 7, wherein monitoring logical hosts installed on the one or more physical hosts, further comprises, automatically removing a process agent associated with a logical host that is removed from the one or more physical hosts.

10. A computer program product embodied in non-transitory computer-readable media that includes executable code, which when executed:
    supports at least one computing solution that is hosted under a virtual hostname on one or more physical hosts in an adaptive computing environment by utilizing at least one remote process agent disposed on the one or more physical hosts;
    provides, on a first physical host on which an instance of a particular computing solution is running under a particular virtual hostname, a remote diagnostics agent that is communicatively linked to the solutions manager and associated with the particular computing solution;
    listens for virtual hostname changes on the first physical host and a second physical host; and
    in response to a relocation of the instance of the particular solution hosted under the particular virtual hostname from the first physical host to the second physical host in the adaptive computing environment,
    automatically relocates the remote diagnostics agent that is communicatively linked to the solutions manager and associated with the particular computing solution hosted under the particular virtual hostname from the first physical host to the second physical host.

11. The computer program product of claim 10, which further includes executable code, which when executed:

provides an agent node controller on a physical host to facilitate automatic installation, start, stop, move, and removal of a remote process agent associated with a host.

* * * * *